United States Patent [19]

Sattler et al.

[11] Patent Number: 4,481,258
[45] Date of Patent: Nov. 6, 1984

[54] UV CURABLE COMPOSITION AND COIL COATINGS

[75] Inventors: Frank A. Sattler, Monroeville, Pa.; William S. Gorton, Jr., Athens, Ga.

[73] Assignee: Westinghouse Electric Corp., Pittsburgh, Pa.

[21] Appl. No.: 433,324

[22] Filed: Oct. 7, 1982

[51] Int. Cl.$^3$ .............................................. C08F 2/50
[52] U.S. Cl. .................................. 428/371; 427/54.1; 427/116; 427/120; 204/159.15; 204/159.19; 525/920; 525/921; 525/923; 525/922; 428/418
[58] Field of Search ...................... 204/159.15, 159.19; 427/54.1; 428/371

[56] References Cited

U.S. PATENT DOCUMENTS

| Re. 30,772 | 10/1981 | Friedlander et al. | 525/421 |
| 3,373,221 | 3/1968 | May | 528/80 |
| 4,221,686 | 9/1980 | Sakiyama et al. | 204/159.19 |
| 4,317,858 | 3/1982 | Sattler | 204/159.15 |

Primary Examiner—John C. Bleutge
Assistant Examiner—A. H. Koeckert
Attorney, Agent, or Firm—R. D. Fuerle

[57] ABSTRACT

Disclosed is a UV-curable coating composition and method of preparing it, a method of coating a conductor with it, and the resulting coated conductor. The composition comprises about 20 to about 40% by weight of an acrylated epoxy which is the reaction product of an epoxy resin and an acrylate adduct. The acrylate adduct is the reaction product of an acrylate which may be either 2-hydroxyethyl acrylate, 2-hydroxypropyl acrylate, 2-hydroxyethyl methacrylate or mixture thereof, and either an anhydride or a diisocyanate. The anhydride may be phthalic anhydride, maleic anhydride, trimellitic anhydride, or mixtures thereof. The diisocyanate can be toluene diisocyanate, 4,4'-diisocyanato diphenyl methane, or mixtures thereof. The composition also includes about 4 to about 15% by weight of an acrylated blocked isocyanate which is the reaction product of caprolactam and an acrylated isocyanate. The acrylated isocyanate is the reaction product of an acrylate which can be 2-hydroxyethyl acrylate, 2-hydroxypropyl acrylate, 2-hydroxyethyl methacrylate, or mixtures thereof, with an isocyanate which can be toluene diisocyanate, 4,4'-diisocyanato diphenyl methane, or mixtures thereof. The composition also includes about 45 to about 65% by weight of a mono-acrylate of which at least 60% by weight is phenoxyethyl acrylate, about 5 to about 20% by weight of a polyacrylate of which at least about 50% is triethylene glycol diacrylate, about 2 to about 5% of a photoinitiator, and about 0.05 to about 0.3% by weight of an inhibitor.

34 Claims, No Drawings

UV CURABLE COMPOSITION AND COIL COATINGS

BACKGROUND OF THE INVENTION

In the manufacture of insulated strip conductor for transformers, bare metal strips are coated with a resin, the resin is cured, and the coated strips are wound into supply coils. Coated strips are typically made by passing bare aluminum strip through a solvent-based enamel, then into a heating tower to evaporate the solvent and cure the enamel. Typically, about three passes are required to obtain a sufficiently thick build on the strips to provide adequate insulation. This process is not as economical as it might be because heat is needed to evaporate the solvent, and the solvent must then be collected or incinerated to prevent environmental pollution.

A 100% solids enamel can also be used for coating the strips. Such enamels can be prepared by using a monomer instead of a solvent. An oligomer is dissolved in the monomer and the monomer then reacts with the oligomer during cure. While this eliminates the solvent, these enamels cure slowly and some of the monomer is still lost to evaporation.

Another difficulty in formulating suitable compositions for this purpose, is that it is difficult to find polymers which are stable in the hot oil environment of transformers. Oil-filled transformers contain paper insulation which releases water when the transformer is in operation. The hot water then hydrolyzes the polymer coated on the strips, especially if they are condensation polymers. The problem is aggravated by the presence of acid. The acid degrades the paper, releasing still more acid, a chain reaction which can rapidly destroy the paper insulation. An acid also accelerates an aqueous attack against a condensation polymer. Acid acceptors are usually added to neutralize the acid, but if the pH in any area of the transformer is too high or too low, the polymer in that area may be attacked by hydrolysis.

SUMMARY OF THE INVENTION

We have discovered an ultraviolet curable composition which is particularly suitable for coating the strip conductors used in forming transformer coils. The composition of this invention is completely solventless and therefore avoids the problems of energy consumption in heating and evaporating the solvent, solvent pollution, and the cost of solvents. The composition produces smooth, uniform coatings and does not require critical control of the speed of the strip under the ultraviolet lights to be successfully applied.

The most extraordinary property of coatings produced with the compositions of this invention is the unexpectedly long thermal life that the coatings have in an oil-filled transformer. Surprisingly, the coatings perform better than the formvar wire enamel standard (a polyvinyl formal blend which usually contains a phenolic resin, an isocyanate, and a melamine formaldehyde resin) which still is used in transformers. In tests which were performed on transformers under extreme temperature conditions, coatings made according to this invention remained intact long after the other components of the transformer had failed. This was a rather unusual finding because when the coatings were tested in air they did not exhibit such an extraordinarily long thermal life, so that one could not have predicted that they would have this property in a transformer.

RELEVANT ART

U.S. Pat. No. 4,221,686 discloses an ultraviolet radiation curable printing ink which is the reaction product of (1) a compound prepared by reacting an unsaturated monobasic acid such as acrylic acid with a polyisocyanate compound such as toluene diisocyanate and (2) a compound prepared by reacting an epoxy compound with an unsaturated monobasic acid. The curing is accomplished by ultraviolet irradiation in the presence of benzoin methyl ester, a photoinitiator.

U.S. Pat. No. 3,373,221 discloses a composition prepared by reacting a polyepoxide with an unsaturated mono- or di-carboxylic acid followed by reacting the resultant product with an organic poly-isocyanate.

DESCRIPTION OF THE INVENTION

The composition of this invention is prepared by blending a number of separate components, some of which must be specially prepared in several reactions.

In the first step of this invention an anhydride or isocyanate acrylate adduct is prepared by reacting an acrylate with an anhydride or a diisocyanate. Acrylates which are useful in preparing the anhydride or isocyanate acrylate adduct are 2-hydroxyethyl acrylate, 2-hydroxypropyl acrylate, 2-hydroxyethyl methacrylate, and mixtures thereof. Of these three acrylates, 2-hydroxyethyl acrylate and 2-hydroxypropyl acrylate are preferred as they react faster in the final UV cure. The anhydrides which can be used are phthalic anhydride, maleic anhydride, trimellitic anhydride, and mixtures thereof. Trimellitic anhydride is preferred because it results in a dicarboxylic acid after the adduct formation which does not end block as the monocarboxylic acids produced by other two anhydrides do. The reaction of the hydroxy acrylate with the anhydride occurs with the hydroxyl group of the acrylate, opening the anhydride ring to produce an anhydride acrylate adduct having an ester linkage with a carboxylic group at one end and an acrylate group at the other:

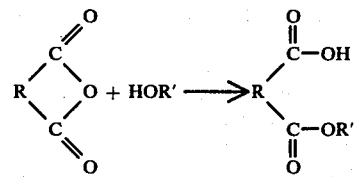

The reaction of the anhydride with the acrylate can be conducted at 120° C. for an hour and a half; if trimellitic anhydride and 2-hydroxyethyl acrylate are used the reaction is complete at an acid number of 364. One mole, ±10 mole % of the anhydride is used per mole of the hydroxy acrylate to prepare the anhydride acrylate adduct.

An isocyanate acrylate adduct can be prepared by reacting the hydroxy acrylate with a diisocyanate. The diisocyanates which can be used are toluene diisocyanate, 4,4'-diisocyanato diphenyl methane, or mixtures thereof. One mole of the diisocyanate, ±1 mole %, is reacted with each mole of the acrylate. The reaction occurs between the isocyanate group and the hydroxyl group of the acrylate. The product is an isocyanate acrylate adduct having a urethane linkage with an isocyanate group at one end and an acrylate group at the other:

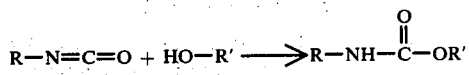

The reaction of the diisocyanate with the acrylate occurs at about 70° C. and is complete in about 1 to 2 hours. The acrylate adduct is preferably prepared by reaction of the anhydride with the acrylate rather than by reaction of the diisocyanate with the acrylate because the anhydride acrylate adduct produces better properties in the coating. Both reactions should be performed in the presence of an acrylate polymerization inhibitor, preferably benzoquinone or hydroquinone, which should be present whenever an acrylate is being reacted and its polymerization (cure) is not desired. The inhibitor remains present with the acrylate adduct reaction products for use in subsequent reactions.

In the next step of this invention the anhydride acrylate adduct, isocyanate acrylate adduct, or mixture thereof is reacted with an epoxy resin to produce an acrylated epoxy. Any epoxy may be used, including bisphenol A epoxies, bisphenol S epoxies, hydantoin epoxies, epoxy novolacs, cycloaliphatic epoxies, or mixtures thereof. Bisphenol A epoxies are preferred as they give the best flexibility and the toughest coatings. The epoxy resin should have an epoxy equivalent weight (E.E.W.) of about 1500 to about 5000 as below 1500 the coatings are too brittle and above 5000 the composition is too viscous.

The reaction of the acrylate adduct with the epoxy resin is conducted in a solution of acrylate monomers to reduce the viscosity. About 40 to about 60% by weight of the total of the acrylate adduct, the epoxy resin, and the monomer, should be mixed monomers. The composition of the acrylate monomer mixture ranges from about 70 to about 90% by weight mono-acrylate and about 10 to about 30% polyacrylate. If less than 70% mono-acrylate is used, the resulting coating will lose heat shock resistance and if more than 90% mono-acrylate is used the coating has poorer cut-through resistance. At least about 60% of the mono-acrylate used in the entire composition should be phenoxyethyl acrylate as it has the best solvent power in the composition and produces more flexible coatings. Another monoacrylate which can be used is dicyclopentadiene acrylate. At least about 50% of the polyacrylate used in the overall composition should be tetraethylene glycol diacrylate as that polyacrylate does not reduce the flexibility of the coatings as much as other polyacrylates. Other suitable polyacrylates include trimethylolpropane triacrylate, hexanediol diacrylate, and neopentyl glycol diacrylate. The polyacrylate need not be added at this step but may be added at another point in forming the composition, and is preferably not added until the final blend is prepared.

If the acrylate adduct is prepared from an anhydride, then 1 equivalent of carboxyl in the acrylate adduct, ±10 equivalent %, is reacted with 2 equivalents of the epoxy resin to make the acrylated epoxy. The reaction of the anhydride acrylate adduct with the epoxy resin can occur at about 140° to about 150° C. for about 1 to about 2 hours; the reaction is complete when an acid number is reached of less than 3. The reaction is believed to occur between one of the epoxy groups on the epoxy resin and the carboxyl group of the acrylate adduct to produce an acrylated epoxy having an ester linkage:

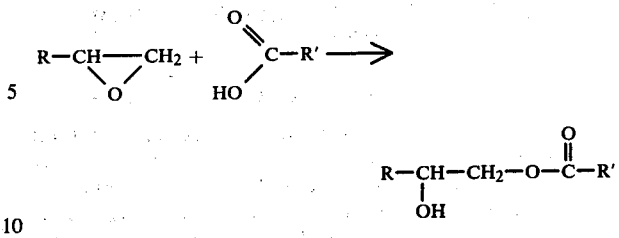

If the acrylate adduct is prepared from a diisocyanate, then 1 equivalent of the acrylate adduct, ±10 mole %, is reacted with 1 equivalent of the epoxy resin. The reaction is believed to occur between the isocyanate group and the hydroxyl group of the epoxy resin to produce an acrylated epoxy having a urethane linkage:

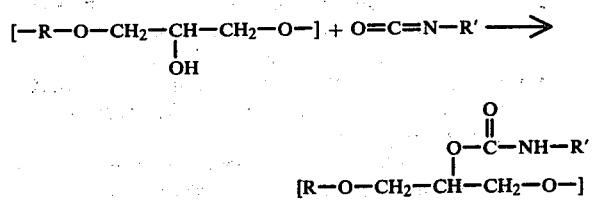

The reaction between the epoxy resin and an isocyanate acrylate adduct will occur at 120° after about 1 hour.

In the next step of this invention, an isocyanate hydroxy acrylate adduct, prepared as described above, is reacted with caprolactam to produce an acrylated blocked isocyanate. About 1 mole of caprolactam is reacted per mole of acrylate adduct, ±1 mole %. The reaction will occur at 100° C. for about 1 hour. The reaction is believed to occur between the isocyanate group and an active hydrogen on the caprolactam ring to form a urethane linkage.

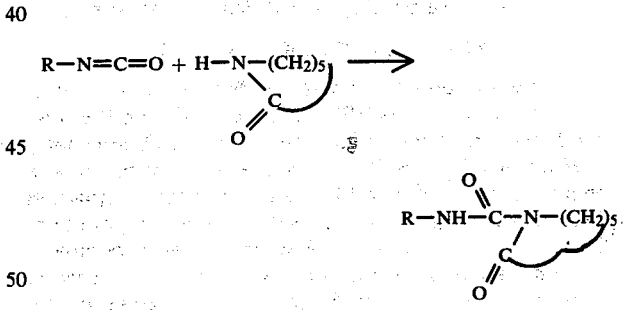

In this reaction, inhibitors should also be present as before to prevent the polymerization of the acrylate groups. Also, about 20 to about 40% by weight of a monomer, based on the total weight of the acrylated blocked isocyanate and the monomer, should be present to solubilize the product.

In the next step of this invention, the acrylated epoxy and the acrylated blocked isocyanate are blended with the other components of the composition which have not already been added to those two components. This includes a photoinitiator which may be benzoin ether, 2,2-dimethoxy-2-phenyl acetophenone, or other common UV photoinitiators. Other optional components which may be added include an acrylated hexamethoxymethylmelamine, an acrylated urethane, or mixtures thereof for a higher thermoplastic flow temperature (cut through); preparation of these materials is described in Examples 17 and 18.

The overall composition comprises about 20 to about 40% of the acrylated epoxy, about 4 to about 15% by weight of the acrylated blocked isocyanate, about 45 to about 65% of the monoacrylate, of which at least 60% is phenoxyethyl acrylate, about 5 to about 20% polyacrylate, of which at least 50% is tetraethylene glycol diacrylate, about 2 to about 5% photoinitiator, about 0.05 to 0.3% inhibitor, and up to about 30% of an acrylated hexamethoxymethylmelamine, an acrylated urethane, or mixture thereof. If less than 20% of the acrylated epoxy is used, the coatings lose flexibility, toughness, and hydrolytic stability, and if more than 40% of acrylated epoxy is used, the coatings lose cut-through resistance. If less than 4% of the acrylated blocked isocyanate is used, the coatings lose cut-through and if more than 15% of the acrylated blocked isocyanate is used, the coatings lose flexibility and heat shock. If less than 45% of the mono-acrylate is used, the composition becomes too viscous to work with easily, and if more than 65% of the mono-acrylate is used, the resulting coatings will lose hardness and cut-through resistance. If less than 5% polyacrylate is used, there will be a loss of cut-through resistance and if more than 20% polyacrylate is used, the coatings will lose heat shock and flexibility. If less than 2% photoinitiator is used, the reaction will occur too slowly and the product will be tacky; more than 5% photoinitiator is unnecessary and wasted. If less than 0.05% inhibitor is used, the composition will have poor tank stability and if more than 0.3% inhibitor is used, the reactions will be slow. If more than 30% acrylated hexamethoxymethyl-melamine, acrylated urethane, or mixture thereof is used flexibility and adhesion are reduced. The preferred composition ranges are about 25 to about 35% by weight acrylated epoxy, about 4 to about 10% acrylated blocked isocyanate, about 50 to about 60% mono-acrylate, about 7 to about 11% polyacrylate, about 2 to about 5% photoinitiator, about 0.05 to about 0.3% inhibitor, and about 10 to about 20% acrylated hexamethoxymethyl-melamine, acrylated urethane, or mixture thereof.

The composition may be used to coat any conductive substrate including such metals as steel, copper, and aluminum; aluminum is especially desired as it is commonly used in transformer coils. The coating can be most easily applied to a conductor by dipping the conductor in it and wiping off the excess. The coated substrate is then passed between a bank of ultraviolet lights which rapidly cures the coating. The lights should be of sufficient intensity to cure the coating, but wavelength and time beneath the lights is not particularly critical. Fusion Systems Mercury H bulbs with over 50% of the spectrum in the ultraviolet spectra can be used; the power of these lamps is typically about 200 to 300 watts per inch. The irradiated coated conductor can then be wound into coils and stored or it can be used immediately.

The invention is most suitable for coating aluminum strip used in forming distribution and power transformer coils. The cross-section of the strips commonly ranges from about 10 to about 70 mils thick and 3 to about 18 inches wide. The strips are then wound into coils which are then assembled with cores to form transformers. A post-cure is then applied of about 130° C. for about 4 to 17 hours. Since transformers are typically dried and baked under those conditions before use anyway as a standard procedure, no additional heating step is required in making transformers.

The following examples further illustrate this invention. The examples generally proceed from less optimal to more optimal formulations. The results of Examples 1 to 12 are given in the table which follows Example 12.

EXAMPLE 1

Part I. The following materials were charged into a two-liter reaction flask equipped with a stirrer, thermometer, nitrogen sparge tube, and short air condenser:
 116.1 g 2-hydroxyethyl acrylate
 148.1 g phthalic anhydride
 2.0 g benzoquinone The reaction mixture was heated at 100°–115° C. for approximately 1½ hours to an acid number of approximately 212 to produce an anhydride acrylate adduct.

Part II. At this point, 356.0 g of an epoxy novolac having an epoxy equivalent weight of 178 which was dissolved in 266 g of 2-phenoxyethyl acrylate was added to the anhydride acrylate adduct of Part I along with 1.2 g of triethanolamine. The reaction was continued at 125°–130° C. for two hours to an acid number of 10.6, which produced an acrylated epoxy. The reaction product was cooled below 60° C. and 35.6 g of benzoin ether, a photoinitiator sold by Stauffer Chemical Company under the designation "Vicure 10," was added.

The formulation was coated onto an aluminum Q-panel by pulling the wet panel through two grooved metering bars (die pins) held in a spring-loaded fixture. The die pins were separated by shims (25 mil panel-28 mil shims). The wet coated panel was irradiated by exposing it at 10 FPM to two ten-inch Fusion Systems "H" lamps at 300 watts/inch, to polymerize the coating and then tested. Additional panels coated and polymerized in this manner were post-cured for four hours at 145° C. and tested in the post-cured condition.

The preliminary evaluation consisted of the following tests:
 1. Build
 2. Pencil Hardness (ASTM D3363-74)
 3. Bend Test (45°–90°–180° bend on 1/16 inch mandrel)

A film with fair hardness (3B to 3H post-cured) but poor flexibility (45°–90° bend), both with and without post-cure, was obtained.

EXAMPLE 2

To 132.1 g of the acrylate adduct prepared in Part I of Example 1 was added 145.0 g of a hydantoin epoxy having an epoxy equivalent weight of 145 dissolved in 119.0 g phenoxyethyl acrylate. The materials were heated in a one-liter reaction flask as in Example I at 125°–130° C. for two hours to an acid number of 2, then cooled. To 50.0 g of the reaction product were added 2.0 g of "Vicure 10" photoinitiator, 0.25 g of tertiary butyl perbenzoate, and 0.02 g of fluorocarbon wetting agent sold by the 3M Company under the trade designation "FC 430." After coating and curing with ultraviolet light, the film was hard but brittle.

EXAMPLE 3

Part I. Into a one-liter reaction flask was charged the following:
 348.2 g toluene diisocyanate (80% 2,4 toluene diisocyanate and 20% 2,6-toluene diisocyanate)
 232.2 g of 2-hydroxyethyl acrylate
 0.12 g benzoquinone The 2-hydroxyethyl acrylate was added portionwise, keeping the exotherm temperature below 60° C. The reaction was continued at 60°-70° C. for one hour and 226.2 g of ε-caprolactam was added. The reaction was continued at 100° C. for one hour and 201.5 g phenoxyethyl acrylate was added and the reaction product, an acrylated blocked isocyanate, was cooled.

Part II. To a 600 ml stainless steel beaker was added:
192.1 g trimellitic anhydride
116.1 g 2-hydroxyethyl acrylate
2.6 g benzoquinone The reactants were heated to 120° C. for 1½ hours to an acid number of 364 to produce an acrylate adduct.

A five-liter reaction flask equipped as in Example 1 was charged with 66.0 g of the above material along with 1928.4 g of a bisphenol A epoxy resin having an epoxy equivalent weight of 2200, 1988.4 g of phenoxyethyl acrylate and 17.1 g of triethanolamine. The reactants were heated to 140°-150° C. for 1½ hours to an acid number of 2 to 5 to produce an acrylated epoxy.

A blend was prepared containing 45.0 g of Part II, 5.0 g of Part I, and 2.0 g of "Vicure 10" photoinitiator. The film was flexible and hard and the hardness improved with a post-cure to 4H/5H.

EXAMPLE 4

To 100.0 g of the formulation of Example 1 was added 50.0 g of hexanediol diacrylate and 2.0 g of "Vicure 10" photoinitiator. The coatings were slightly harder than those of Example 1, but still lacked the desired flexibility.

EXAMPLE 5

To 100.0 g of the formulation of Example 2 were added 50.0 g of trimethylolpropane triacrylate and 2.0 g of "Vicure 10" photoinitiator. Good hardness (5H-6H) was obtained, but low flexibility.

EXAMPLE 6

To 100.0 g of the formulation of Example 3 was added 50.0 g tetraethyleneglycol diacrylate and 2.0 g "Vicure 10" photoinitiator. The film was hard (3H/4H) and flexible (180° bend) but showed a lack of adhesion.

EXAMPLE 7

The reaction of Part I of Example 3 was duplicated but 376.0 g of an epoxy with an epoxy equivalent weight of 188 replaced the 201.5 g of phenoxyethyl acrylate at the end of the reaction.

To 25.0 g of this material was added 25.0 g of Part II of Example 3 and 2.0 g of "Vicure 10" photoinitiator. The UV-cured coating had good hardness and flexibility. The hardness was improved to 4H/5H with a post-cure but the flexibility was reduced to passing a 90° bend.

EXAMPLE 8

To 20.0 g of the composition of Example 7 was added 10.0 g of dicyclopentadiene acrylate plus 0.4 g "Vicure 10" photoinitiator. The UV-cured film was harder than than that of Example 7 and the flexibility was lower. After post-cure, both the flexibility and hardness were good.

EXAMPLE 9

To 20.0 g of the composition of Example 3 was added 10.0 g dicyclopentadiene acrylate plus 0.4 g of "Vicure 10" photoinitiator. The UV-cured coating was brittle but the post-cured coating was flexible with good hardness.

EXAMPLE 10

To 20.0 g of the composition of Example 3 was added 10.0 g of 2-phenoxyethyl acrylate plus 0.4 g of "Vicure 10" photoinitiator. The UV-cured coating was flexible with fair hardness. After post-cure the hardness was improved to H/2H and the good flexibility was retained.

EXAMPLE 11

To 20.0 g of the composition of Example 3 was added 7.5 g of dicyclopentadiene acrylate and 2.5 g tetraethylene glycol diacrylate and 0.4 g "Vicure 10" photoinitiator. The UV-cured coating was brittle and the post-cured coating was flexible with good hardness (3H/4H).

EXAMPLE 12

To 20.0 g of the composition of Example 3 was added 7.5 g phenoxyethyl acrylate plus 2.5 g tetraethylene glycol diacrylate plus 0.4 g "Vicure 10" photoinitiator. The UV-cured panel showed a hardness of 3B/H which was increased to 2H/3H with post-cure. Flexibility was good before and after post-cure.

| Example | Build | UV-Cured Pencil Hardness (ASTM D3363-74) | UV-Cured Bend Test (1/16 Dia. Mandrel) | UV-Cured plus 4 hr. 145° C. Pencil Hardness | Change | Post-Bake Bend Test (1/16 Dia. Mandrel) |
|---|---|---|---|---|---|---|
| 1 | .0058" | 3B/H | 45° Fails[1] | 2H/3H | +3 | 90° Cracks |
| 2 | .0041" | 3H/4H | Brittle Film Poor Adhesion | 3H/4H | 0 | 90° Cracks |
| 3 | .0052" | 3B/H | Flexible Film Good Adhesion | 4H/5H | +4 | 180° O.K. |
| 4 | .0034" | 2H/3H | Fails | 3H/4H | +1 | 90° Cracks |
| 5 | .0035" | 5H/6H | Fails 45° | 6H/7H | +1 | 90° Cracks |
| 6 | .0050" | 3H/4H | 180° O.K.[1] | 6H/7H | +3 | 180° O.K. |
| 7 | .0058" | 3B/H | Flexible Film Fair Adhesion | 4H/5H | +4 | 90° O.K. 180° Cracks |
| 8 | .0033" | 3H/4H | 90° Fails | 4H/5H | +1 | 180° O.K. |
| 9 | .0024" | 3B/H | 90° Cracks 180° Separates | 2H/3H | +2 | 90° O.K. 180° O.K. |
| 10 | .0023" | 3B/H | 90° O.K. 180° O.K. | H/2H | +1 | 90° O.K. 180° O.K. |
| 11 | .0029" | 3B/H | 90° Cracks 180° Separates | 3H/4H | +3 | 90° O.K. 180° O.K. |
| 12 | .0022" | 3B/H | 90° O.K. | 2H/3H | +2 | 90° O.K. |

-continued

| Example | Build | UV-Cured Pencil Hardness (ASTM D3363-74) | UV-Cured Bend Test (1/16 Dia. Mandrel) | UV-Cured plus 4 hr. 145° C. Pencil Hardness | Change | Post-Bake Bend Test (1/16 Dia. Mandrel) |
|---|---|---|---|---|---|---|
| | | | 180° O.K. | | | 180° O.K. |

[1] Flexible but adheres poorly. Can be peeled like a strippable coating.

EXAMPLE 13

The coated Q-panels of Examples 3, 6, 8, 10, and 12 were selected for 28-day tests at 150° C. sealed in transformer oil. The results of 180° bend tests and hardness tests after aging are shown in the table which follows. The composition of Examples 3, 10, and 12 passed the bend tests with both UV-cured and post-cured panels after the 150° C. aging test. The post-cured panels of Example 10 retained the initial hardness after aging (H/2H). The post-cured panels of Example 12 increased two more grades in hardness with aging to 4H/5H.

| Example | 180° Bend Test UV-Cure | 180° Bend Test Post-Baked | Hardness Post-Baked |
|---|---|---|---|
| 3 | Pass | Pass | — |
| 6 | Fail | Fail | — |
| 8 | Fail | Pass | — |
| 10 | Pass | Pass | H/2H |
| 12 | Pass | Pass | 4H/5H |

Post-Baked 4 Hr. at 145° C.

EXAMPLE 14

The solutions of Examples 10 and 12 were coated on #17 AWG aluminum wire at 20 ft/min to 60 ft/min using a 49 mil bullet die and curing with four 12-inch UV mercury lamps at 300 watts/in. with the lamps parallel to the wire travel spaced 90° apart around the wire. The results are given in the table which follows:

| | Example 10 | | | Example 12 | | |
|---|---|---|---|---|---|---|
| Wire Speed ft/min | 20 | 40 | 60 | 20 | 40 | 60 |
| Smoothness | Smooth | Smooth | Smooth | Smooth | Smooth | Smooth |
| Build, mil | 1.8 | 1.8 | 1.8 | 1.6–1.8 | 1.6–1.8 | 1.6–1.8 |
| Quick Snap | Pass | Pass | Pass | Pass | Pass | Pass |
| Elongation + 1X mandrel[2] | 25% | 25% | 25% | 20 | 20 | 20 |
| Cut-through Temperature[3] | 73° C. | — | — | 92° C. | — | — |

[1] Passed parallel to 4 UV lamps, 12 inches long at 300 watt/in.
[2] Maximum elongation passing a 1X mandrel.
[3] 2 Kg weight on crossed wire-temperature increased at 5° C./min.

EXAMPLE 15

Good flexible coatings at 1.6–1.8 mils build were obtained using the composition of Examples 10 and 12, on AWG 17 aluminum wire coated at 20 ft/min. The 20 ft/min coatings were aged for 28 days at 150° C. in transformer oil. The results of cut-through tests are shown in the table which follows. The cut-through resistance of Example 12 increased from 92° C. as made, to 150° C. after four hours post-cure at 145° C. and to 186° C. after four hours post-cure plus 28 days aging in hot oil.

| Formulation | Cut-Through Temperature[1] As Made | Post-Baked 4 Hr. @ 145° C. | Post-Baked + 28 Days in 150° C. Oil |
|---|---|---|---|
| Example 10 | 73° C. | 103° C. | 114° C. |
| Example 12 | 92° C. | 150° C. | 186° C. |

Two kg weight on crossed wires, temperature increased 5° C./min.

EXAMPLE 16

The composition of Example 12 was chosen for final evaluation by coating on 0.010 inch by 5½ inch aluminum strip. Two thousand feet of strip was successfully coated by continuously pumping excess coating on the strip and by pulling the wet strip through two grooved metering bars (die pins) held in a spring-loaded fixture. The die pins were separated by shims (10 mil strip—13 mil shims). The wet coated strip was irradiated by exposing it at 10 FPM to two ten-inch Fusion Systems "H" lamps at 300 watts/inch, one lamp for each side of the strip. The coated strip was rewound into round supply coils, similar to those on which bare strip is supplied. This aluminum strip was wound into thirteen 10 kVa 7200 V transformers, which have all passed production tests. The results of thermal life tests on these transformers were extraordinarily successful. Three transformers thermally aged at 200° C. have exceeded 1500 hours life, which is ten times the required life at that temperature. At 180° C. the units have exceeded 2200 hours life, which is almost five times the required life at that temperature. The UV coatings on strip removed from transformers aged at 200° C. still retain good color, flexibility and adhesion long after the Formvar wire enamel in the high voltage windings is badly discolored and embrittled.

The enamel of this composition performs ideally as an aluminum strip insulation since it cures to a "B-stage" during the UV cure. It then completes its cure during the coil bake, developing turn-to-turn adhesion. A bifilar test coil wound from two strips of 0.010 inch by 5½ inch aluminum enameled with the composition of Example 12 developed excellent turn-to-turn adhesion during a standard coil bake while maintaining good turn-to-turn electric strength.

The viscosity of Example 12 measured 5900 cp at 26° C. when prepared, which is a convenient viscosity for strip coating. The tank life at 26° C. was good. After two months at 26° C. the viscosity was 6030 cp and after ten months it had increased to only 8000 cp.

EXAMPLE 17

Part I. Into a one liter reaction flask are charged the following:

174.1 g toluene diisocyanate (80% 2,4 and 20% 2,6)
116.1 g 2-hydroxyethyl acrylate
0.12 g benzoquinone The 2-hydroxyethyl acrylate was added portion wise with the benzoquinone dissolved in. The exotherm temperature was kept below 60° C. The reaction was continued at 60°-70° C. for one hour and 185.0 g hexamethoxymethylmelamine was added. The reaction was continued at 120°-125° C. for ½ hour and 121.2 g phenoxyethyl acrylate was added and the solution cooled.

To 80.0 g of the solution of Example 12 was added 20.0 g of Part I. The UV cured coating was flexible and showed a hardness of 1H/2H before post-cure and a hardness of 3H/4H after post cure. It also showed an improvement of thermoplastic flow temperature after post-cure when compared with Example 12.

EXAMPLE 18

Into a 2-liter flask equipped with a motor stirrer, air condenser and nitrogen sparge was added:

696.4 g toluene diisocyante
506.6 g 2-phenoxyethyl acrylate
1.76 g benzoquinone

To this solution was added slowly with cooling 270.8 g 1,4-butanediol, keeping the exotherm temperature below 120° C. The reaction was continued at 125° C. for one hour, then cooled to 100° C. then 232.2 g 2-hydroxyethyl acrylate was added slowly and reacted for an additional hour at 125° C. The product was dissolved in 426.9 g of 2-phenoxyethyl acrylate and cooled.

To 80.0 g of the blend of Example 12 was added 20.0 g of the above acrylated urethane. The UV coated panel showed excellent flexibility and hardness which improved after a thermal post-cure.

We claim:

1. A UV curable coating composition comprising
(A) about 20 to about 40% by weight of an acrylated epoxy which comprises the reaction product of about 2 equiv. of an epoxy resin having an E.E.W. of about 1500 to about 5000, and about 0.9 to about 1.1 equiv. of a compound selected from the group consisting of
  (1) an anhydride acrylate adduct where said anhydride acrylate adduct has a functionality of 1 except in the case of trimellitic anhydride where said adduct has a functionality of 2 where said anhydride acrylate adduct comprises the reaction product of
    (a) an acrylate selected from the group consisting of 2-hydroxyethyl acrylate, 2-hydroxypropyl acrylate, 2-hydroxyethyl methacrylate, and mixtures thereof; and
    (b) 1 mole, ±10 mole %, per mole of said acrylate of an anhydride selected from the group consisting of phthalic anhydride, maleic anhydride, trimellitic anhydride, and mixtures thereof;
  (2) an isocyanate which comprises the reaction product of
    (a) 1 mole of an acrylate selected from the group consisting of 2-hydroxyethyl acrylate, 2-hydroxypropyl acrylate, 2-hydroxyethyl methacrylate, and mixtures thereof; and
    (b) 1 mole of toluene diisocyanate, 4,4'-diisocyanato diphenyl methane, and mixtures thereof; and
  (3) mixtures of (1) and (2)
(B) about 4 to about 15% by weight of an acrylated blocked isocyanate which comprises the reaction product of 1 mole caprolactam and 1 mole of an isocyanate adduct which comprises the reaction product of
  (1) 1 mole of an acrylate selected from the group consisting of 2-hydroxyethyl acrylate, 2-hydroxyethyl methacrylate and mixtures thereof; and
  (2) about 0.99 to about 1.01 mole of a compound selected from the group consisting of toluene diisocyanate, 4,4'-diisocyanato diphenyl methane, and mixtures thereof;
(C) about 4.5 to about 65% by weight of a monoacrylate, of which at least 60% by weight is phenoxyethyl acrylate;
(D) about 5 to about 20% by weight of a polyacrylate, of which at least about 50% is tetraethylene glycol diacrylate;
(E) about 2 to about 5% by weight of a photo-initiator;
(F) about 0.05 to about 0.3% by weight inhibitor; and
(G) up to about 30% of a compound selected from the group consisting of acrylated hexamethoxymethylmelamine, acrylated urethane, and mixture thereof.

2. A composition according to claim 1 wherein said epoxy resin is a bisphenol A epoxy resin.

3. A composition according to claim 1 wherein said acrylate is 2-hydroxyethyl acrylate.

4. A composition according to claim 1 wherein said acrylate is 2-hydroxypropyl acrylate.

5. A composition according to claim 1 wherein said acrylated epoxy is the reaction product of an epoxy resin and an anhydride acrylate adduct.

6. A composition according to claim 5 wherein said anhydride is trimellitic anhydride.

7. A composition according to claim 1 wherein said inhibitor is selected from the group consisting of benzoquinone, hydroquinone, and mixtures thereof.

8. A UV curable coating composition comprising
(A) about 25 to about 35% by weight of an acrylated epoxy which comprises the reaction product of
  (1) a bisphenol A epoxy resin having an E.E.W. of about 1500 to about 5000;
  (2) an acrylate adduct which comprises the reaction product of
    (a) an acrylate selected from the group consisting of 2-hydroxyethyl acrylate, 2-hydroxyethyl acrylate, and mixtures thereof; and
    (b) 1 mole, ±10 mole % per mole of said acrylate, of trimellitic anhydride,
(B) about 4 to about 10% by weight of an acrylated blocked isocyanate which comprises the reaction product of
  (1) caprolactam; and
  (2) 1 mole, ±1 mole %, per mole of said caprolactam, of an isocyanate adduct which comprises the reaction product of
    (a) an acrylate selected from the group consisting of 2-hydroxyethyl acrylate, 2-hydroxypropyl acrylate, and mixtures thereof;
    (b) 1 mole, ±1 mole % per mole of said acrylate, of toluene diisocyanate, 4,4' diisocyanato diphenyl methane and mixtures thereof;

(C) about 50 to about 60% by weight of a monoacrylate, of which at least 60% by weight is phenoxyethyl acrylate;

(D) about 7 to about 11% by weight of a polyacrylate, of which at least about 50% is tetraethylene glycol diacrylate;

(E) about 2 to about 5% of a photoinitiator;

(F) about 0.05 to about 0.3% inhibitor; and (G) about 10 to about 20% of a compound selected from the group consisting of acrylated hexamethoxymethylmelamine, acrylated urethane, and mixtures thereof.

9. A method of preparing a UV curable composition comprising
(1) forming an acrylate adduct by reacting, in the presence of a monoacrylate and an inhibitor, an acrylate selected from the group consisting of 2-hydroxyethyl acrylate, 2-hydroxypropyl acrylate, 2-hydroxyethyl methacrylate, and mixtures thereof, with a compound selected from the group consisting of
 (a) 1 mole, ±10 mole %, per mole of said acrylate, of a compound selected from the group consisting of phthalic anhydride, maleic anhydride, trimellitic anhydride, and mixtures thereof
 (b) 1 mole, ±1 mole %, per mole of said acrylate, of a compound selected from the group consisting of toluene diisocyanate, 4,4'-diisocyanato dispheyl methane, and mixtures thereof; and
 (c) mixture of (a) and (b);
(2) forming an acrylated epoxy by reacting said acrylate adduct with an epoxy resin having an E.E.W. of about 1500 to about 5000 in the presence of a monoacrylate and an inhibitor;
(3) forming an acrylated isocyanate by reacting an acrylate selected from the group consisting of 2-hydroxyethyl acrylate, 2-hydroxypropyl acrylate, 2-hydroxyethyl methacrylate, and mixtures thereof, with 1 mole, ±1 mole %, per mole of said acrylate, of a compound selected from the group consisting of toluene diisocyanate, 4,4'-diisocyanato diphenyl methane, and mixtures thereof, in the presence of a monoacrylate and an inhibitor;
(4) forming an acrylated blocked isocyanate by reacting caprolactam with 1 mole, ±1 mole %, per mole of said caprolactam, of said acrylated isocyanate;
(5) forming a blend of
 (a) about 20 to about 40% by weight of said acrylated epoxy;
 (b) about 4 to about 15% by weight of said acrylated blocked isocyanate;
 (c) about 45 to about 65% by weight of said monoacrylate, of which at least 60% by weight is phenoxyethyl acrylate;
 (d) about 5 to about 20% by weight of a polyacrylate, of which at least about 50% is tetraethylene glycol diacrylate;
 (e) about 2 to about 5% of a photoinitiator; and
 (f) about 0.05 to about 0.3% by weight inhibitor.

10. A method of forming a coating on a conductor comprising
(A) applying a composition according to claim 1 to said conductor;
(B) curing said composition by exposure to UV radiation;
(C) forming said conductor into a coil; and
(D) post curing said coil with heat.

11. A method according to claim 10 wherein said conductor is a metal strip.

12. A method according to claim 11 wherein said metal is aluminum.

13. A method according to claim 12 including the additional step between steps (B) and (C) of winding said metal strip into a transformer coil.

14. A transformer coil made according to the method of claim 13.

15. A composition according to claim 8 wherein said acrylate is 2-hydroxyethyl acrylate.

16. A composition according to claim 8 wherein said inhibitor is selected from the group consisting of benzoquinone, hydroquinone, and mixtures thereof.

17. A method according to claim 9 wherein said epoxy resin is a bisphenol A epoxy resin.

18. A method according to claim 9 wherein said acrylate is 2-hydroxyethyl acrylate.

19. A method according to claim 9 wherein said acrylate is 2-hydroxypropyl acrylate.

20. A method according to claim 9 wherein said acrylated epoxy is the reaction product of an epoxy resin and an anhydride acrylate adduct.

21. A method according to claim 20 wherein said anhydride is trimellitic anhydride.

22. A method according to claim 9 wherein said inhibitor is selected from the group consisting of benzoquinone, hydroquinone, and mixtures thereof.

23. A method according to claim 10 wherein said epoxy resin is a bisphenol A epoxy resin.

24. A method according to claim 10 wherein said acrylate is 2-hydroxyethyl acrylate.

25. A method according to claim 10 wherein said acrylate is 2-hydroxypropyl acrylate.

26. A method according to claim 10 wherein said acrylated epoxy is the reaction product of an epoxy resin and an anhydride acrylate adduct.

27. A method according to claim 26 wherein said anhydride is trimellitic anhydride.

28. A method according to claim 10 wherein said inhibitor is selected from the group consisting of benzoquinone, hydroquinone, and mixtures thereof.

29. A transformer coil according to claim 14 wherein said epoxy resin is a bisphenol A epoxy resin.

30. A transformer coil according to claim 14 wherein said acrylate is 2-hydroxyethyl acrylate.

31. A transformer coil according to claim 14 wherein said acrylate is 2-hydroxypropyl acrylate.

32. A transformer coil according to claim 14 wherein said acrylated epoxy is the reaction product of an epoxy resin and an anhydride acrylate adduct.

33. A transformer coil according to claim 32 wherein said anhydride is trimellitic anhydride.

34. A transformer coil according to claim 14 wherein said inhibitor is selected from the group consisting of benzoquinone, hydroquinone, and mixtures thereof.

* * * * *